Patented Feb. 19, 1952

2,586,312

UNITED STATES PATENT OFFICE 2,586,312

POLYPHOSPHONITRILIC ESTERS AND THEIR PREPARATION

Binyamin Refael Dishon and Frieda Goldschmidt, Rehovoth, Palestine; Irene E. Dishon and Walter (Yehuda) Deutsch, administrators of said Binyamin R. Dishon, deceased No Drawing. Application February 4, 1948, Serial No. 6,338

15 Claims. (Cl. 260—2)

This invention is concerned with derivatives of phosphonitrilic acid and relates more particularly to high polymeric esters thereof.

Certain derivatives of phosphonitrilic acid are known to have rubber-like character. This is true for phosphonitrilic chlorides and fluorides of the empirical formula $(NPCl_2)_x$ or $(NPF_2)_x$ wherein $x$ is of the order of 200 or above. It is most probable that the molecules of these high molecular rubbery compounds are chains of alternating phosphorus and nitrogen atoms wherein two halogen atoms are bound to each phosphorus atom, the structure thus being in principle as follows:

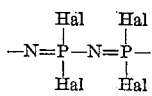

One also knows low molecular (e. g. trimeric or tetrameric) phosphonitrilic derivatives which crystallize and are definitely not rubber-like. It has already been proposed to replace in these latter compounds the halogen by alkoxyl groups by allowing the halide to react with alcohol in the heat in the presence of an acid binding substance. These reactions, even if they start from relatively high molecular phosphonitrilic halides, invariably lead to the formation of low molecular phosphonitrilic esters of an oily character.

The present invention has the object to provide high polymeric phosphonitrilic esters (hereinafter also called "polyphosphonitrilic esters") which have a rubbery character and are insoluble but can, by a controlled treatment, be converted into slightly depolymerized but still rather high polymeric thermoplastic, amorphous and somewhat elastic products (hereinafter also called "partly depolymerized esters") suitable for many technical applications.

Another object of the invention is to provide a process for the direct preparation of partly depoylmerized esters without passing through the stage of the insoluble rubber-like high polymer esters.

According to this invention, high polymeric phosphonitrilic chlorides, also known as polyphosphonitrilic chlorides, of rubber-like consistency are subjected to reaction, at temperatures up to about 85° C. and under anhydrous conditions, with alcohols in the presence of pyridine which serves as an acid binding substance.

The reaction of the polyphosphonitrilic chlorides with alcohols results in the virtually complete elimination of the chlorine from the molecule of the former and the replacement of the major part thereof by alkoxy groups. Those phosphorus atoms in the chain from which the chlorine has been removed without having been replaced by an alkoxy radical are most probably connected to oxygen atoms. Accordingly, the empirical formula of the new products is most probably as follows:

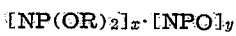

wherein $x$ can be assumed to be greater than $y$.

Where RO is the radical of a lower alcohol the products have rubbery character inasmuch as they have long range elasticity, but it has not been possible so far to vulcanize them. They are insoluble in the usual organic solvents but swell therein to a high degree. Where RO denotes the radical of a higher alcohol, e. g. octyl or lauryl alcohol, the products are less rubbery inasmuch as they lose their high range elasticity, but they are still elastically compressible. On the other hand, they assume a somewhat greasy character.

The products according to the invention are suitable for many applications. They may serve as plastic modifiers, especially as plasticizers for both plastics and rubber. Dissolved in lubricants they may be employed as anticorrosives, and they have also themselves lubricant properties. These products may also themselves form the principal constituents of plastic compositions which, for the rest, may contain smaller amounts of other plastics.

The polyphosphonitrilic esters produced as aforesaid have the property of swelling in organic solvents, preferentially in those which are not miscible with water, e. g. aromatic hydrocarbons and halogen derivatives of both aliphatic and aromatic hydrocarbons, for example, benzene, toluene, xylene, chloroform, carbon tetrachloride, tetrachloroethane. By so swelling the polyphosphonitrilic esters become softer and assume gel-like character. The swelling is reversible, that is, the solvent can be evaporated whereby the ester is brought back into its original state, provided the evaporation takes place at moderate temperature, say below about 100° C.

The properties of the polyphosphonitrilic esters can be modified thereby that prior to the reaction with alcohols the polyphosphonitrilic chloride is allowed to swell in limited amounts of solvents of the kind mentioned above, or mixtures thereof, or thereby that the reaction with alcohols is carried out in the presence of such solvents. The final products so obtained are softer and are still more ready to swell in the aforesaid solvents, such swelling being again reversible.

The polyphosphonitrilic esters aforesaid are closely related to other polyphosphonitrilic esters which are slightly less high polymeric but have still high polymeric character. For the sake of distinction this latter class of polyphosphonitrilic esters will be referred to herein as "partly depolymerized phosphonitrilic esters."

The partly depolymerized phosphonitrilic esters may be prepared either from the above described high polymeric phosphonitrilic esters, or directly from polyphosphonitrilic chlorides in principle in the same way as the high polymeric esters. These two ways of preparing the partly depolymerized esters may be called the "indirect" and "direct" method respectively.

The "indirect" method consists therein that the high polymeric esters are gently heated for several hours to temperatures of, say, between 110° and 140° C. This heating treatment may be effected, if desired, in the presence of solvents of the kind referred to above as swelling agents.

The "direct" method consists therein that the polyphosphonitrilic chloride serving as a starting material is made to swell, prior to its reaction with alcohol, in a large excess of a solvent or solvent mixture of the kind mentioned hereinbefore as swelling agents for the high polymeric esters. It has been said above that if the polyphosphonitrilic chloride is made to swell in a limited amount of such solvent, the product of the reaction with alcohol of the chloride so preswelled is still a high polymeric ester, though with somewhat modified characteristcs. There is, of course, no clear-cut borderline between the "limited amounts" of solvent leading to this result, and the "large excess" of solvent which leads in the result to the formation of the partly depolymerized ester. However, it may be said that where the pre-swelling of the polyphosphonitrilic chloride is pushed to the possible maximum degree of swelling of the chloride, the result of the reaction of the latter with alcohol will be the partly depolymerized ester. The exact amounts of solvent that will have to be employed for the pre-swelling will as a rule have to be ascertained beforehand by experiment, in accordance with the desired properties of the resulting polyphosphonitrilic ester.

The partly depolymerized phosphonitrilic esters, prepared by either the direct or indirect method described hereinbefore, are soluble in various solvents, i. e. those of the kind referred to above as swelling agents. The intrinsic viscosity of the partly depolymerized esters in these solutions proves that they are still rather high polymeric, for it is of the order of the intrinsic viscosity of ordinary high polymeric substances. Incidentally, the intrinsic viscosity of the partly depolymerized esters prepared by the direct method is slightly higher than that of the indirectly prepared ones.

The partly depolymerized esters produced in either way are particularly suitable as ingredients of cellulosic lacquers and films. For example, if added in relatively small percentages, say up to 20%, to nitrocellulose, they act as plasticizers. If a much higher proportion thereof is mixed with nitrocellulose, the films obtained from such mixtures have quite different properties. For example, from a mixture of two parts by weight of partly depolymerized esters with one part of nitrocellulose dissolved in ethyl acetate, films can be obtained which are far more stretchable and far less inflammable than usual nitrocellulose films.

The invention is illustrated by the following examples to which it is however not limited.

*Example 1*

3.5 g. of rubber-like high-polymeric phosphonitrilic chloride are immersed in a mixture of 14 g. of absolute alcohol and 24 g. of pyridine. After standing at room temperature for 24 hours, the solution is decanted and the remaining gel washed several times with $CHCl_3$ until no chloride ion is found in the wash solution. The gel is dried at 65° C. in vacuo, whereby 2.9 g. of polyphosphonitrilic ethyl ester are obtained in the form of a rubbery crummy milky mass.

*Example 2*

5.8 g. of rubber-like high-polymeric phosphonitrilic chloride are immersed in a mixture of 37 g. of n-butanol and 40 g. of water-free pyridine. After standing for 24 hours at room temperature the solution is decanted and the residual gel repeatedly washed with acetone until it is free from chloride ion. The product is dried in vacuo at 65° C., whereby 6 g. of polyphosphonitrilic n-butyl ester are obtained in the form of a rubbery crummy milky mass.

*Example 3*

5.8 g. of rubber-like high-polymeric phosphonitrilic chloride are immersed in 58 cc. of toluene. After 24 hours a mixture of 37 g. of n-butanol and 40 g. of pyridine is added. After another 24 hours the solution is decanted and the residual gel washed with acetone and dried, whereby 5 g. of partly depolymerized polyphosphonitrilic n-butyl ester are obtained in the form of a transparent plasto-elastic mass which is soluble in benzene, $CHCl_3$ and similar solvents.

*Example 4*

2 g. of partly depolymerized polyphosphonitrilic n-butyl ester and 1 g. of nitrocellulose containing 8.0% of N are dissolved in 25 cc. of ethyl acetate at room temperature. After 24 hours the viscous solution is poured out on a glass plate and dried at 45° C. A clear film of high extensibility and low inflammability is obtained.

*Example 5*

5.8 g. of high-polymeric phosphonitrilic chloride are immersed in 29 cc. of toluene. After 24 hours a mixture of 37 g. of n-butanol and 40 g. of pyridine are added. After another 24 hours the solution is decanted and the residual gel washed with acetone and dried; 6.1 g. of polyphosphonitrilic n-butyl ester in the form of transparent elastic pieces are obtained.

*Example 6*

5.8 g. of high-polymeric phosphonitrilic chloride are immersed for 24 hours in a mixture of 37 g. of n-butanol, 40 g. of pyridine and 58 cc. of toluene. The solution is decanted and the residual gel washed with acetate and dried; 6.3 g. of polyphosphonitrilic butyl ester in the form of transparent elastic pieces are obtained.

*Example 7*

6.3 g. of the polyphosphonitrilic butyl ester obtained in the manner described in Example 6 are immersed and allowed to swell in 100 cc. of toluene. After one hour the mixture is heated to boiling for 1½ hours. The toluene is distilled off from the solution at reduced pressure and a tacky plasto-elastic mass is obtained as a residue which is a partly depolymerized polyphosphonitrilic butyl ester soluble in various organic solvents, e. g. aromatic hydrocarbons and chloro-hydrocarbons.

We claim:

1. The process of preparing elastomeric polyphosphonitrilic esters which comprises immersing at room temperature high-molecular polyphosphonitrilic chloride of rubber-like consistency in a liquid mixture containing pyridine and a monovalent aliphatic alcohol free from groups, other than its alcoholic hydroxyl group, capable of reacting with the chlorine contained in the polyphosphonitrilic chloride, both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

2. The process of preparing elastomeric polyphosphonitrilic esters which comprises immersing at room temperature high-molecular polyphosphonitrilic chloride of rubber-like consistency in a liquid mixture containing pyridine and a monovalent aliphatic alcohol free from groups, other than its alcoholic hydroxyl group capable of reacting with the chlorine contained in the polyphosphonitrilic chloride, both the alcohol and pyridine being used in excess of the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

3. The process of preparing elastomeric polyphosphonitrilic esters which comprises immersing at room temperature high-molecular polyphosphonitrilic chloride of rubber-like consistency in a liquid mixture containing pyridine and a monovalent aliphatic alcohol free from groups, other than its alcoholic hydroxyl group, capable of reacting with the chlorine contained in the polyphosphonitrilic chloride, both the alcohol and pyridine being used in amounts equal to about five times the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

4. The process of preparing elastomeric polyphosphonitrilic esters which comprises immersing at room temperature high-molecular polyphosphonitrilic chloride of rubber-like consistency in a liquid mixture containing pyridine and ethyl alcohol, both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for an least the time required for producing a polyphosphonitrilic ester in the form of a gel.

5. The process of preparing elastomeric polyphosphonitrilic esters which comprises immersing at room temperature high-molecular polyphosphonitrilic chloride of rubber-like consistency in a liquid mixture containing pyridine and ethyl alcohol in amounts respectively about seven and four times the weight of the polyphosphonitrilic chloride, and leaving the reaction mixture to stand for at least the time required for producing a polyphosphonitrilic ester in the form of a gel.

6. The process of preparing elastomeric polyphosphonitrilic esters which comprises immersing at room temperature high-molecular polyphosphonitrilic chlorides of rubber-like consistency in an organic solvent immiscible with water and allowing the mixture to stand at least until no more swelling occurs; then adding thereto a liquid mixture containing pyridine and a monovalent aliphatic alcohol free from groups, other than its alcoholic hydroxyl group, capable of reacting with the chlorine contained in the polyphosphonitrilic chloride, both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

7. The process of preparing elastomeric polyphosphonitrilic esters which comprises immersing at room temperature high-molecular polyphosphonitrilic chlorides of rubber-like consistency in an organic solvent selected from the group consisting of aromatic hydrocarbons and halogen derivatives of aliphatic and aromatic hydrocarbons and allowing the mixture to stand at least until no more swelling occurs; then adding thereto a liquid mixture containing pyridine and a monovalent aliphatic alcohol free from groups, other than its alcoholic hydroxyl group, capable of reacting with the chlorine contained in the polyphosphonitrilic chloride, both the alcohol and pyridine being used in amounts at least equal to the stoichiometric equivalents required for respectively replacing the chlorine contents of the polyphosphonitrillic chloride and binding the hydrogen chloride thereby produced, and leaving the reaction mixture to stand for at least the time required for producing a polyphosphonitrilic ester in the form of a gel.

8. The process of preparing elastomeric polyphosphonitrilic esters which comprises immersing at room temperature high-molecular polyphosphonitrilic chlorides of rubber-like consistency in toluene and allowing the mixture to stand at least until no more swelling occurs; then adding thereto a liquid mixture containing pyridine and a monovalent aliphatic alcohol free from groups, other than its alcoholic hydroxyl group, capable of reacting with the chlorine contained in the polyphosphonitrilic chloride, both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

9. A process as claimed in claim 4, wherein the pyridine alcohol mixture contains in addition an organic solvent selected from the group consisting of aromatic hydrocarbons and halogen derivatives of aliphatic and aromatic hydrocarbons.

10. A process as claimed in claim 1, wherein the pyridine-alcohol mixture contains in addition toluene.

11. Polyphosphonitrilic esters, being substances of high polymeric character prepared by the interaction at room temperature of high-molecular polyphosphonitrilic chlorides of rubber-like consistency with a liquid mixture of pyridine and a monovalent aliphatic alcohol free from groups, other than its alcoholic hydroxyl group, capable of reacting with the chlorine contained in the polyphosphonitrilic chloride, both the alcohol and pyridine being used in amounts at least equal to the stoichiometric equivalents required for respectively replacing the chlorine contents of the polyphosphonitrilic chloride and binding the hydrogen chloride thereby produced.

12. Polyphosphonitrilic esters, being substances of high polymeric character prepared by the interaction at room temperature of high-molecular polyphosphonitrilic chlorides of rubber-like consistency with a liquid mixture of pyridine and ethyl alcohol, both used in excess of the stoichiometric equivalents required for respectively replacing the chlorine contents of the polyphosphonitrilic chloride and binding the hydrogen chloride thereby produced.

13. The process of preparing elastomeric polyphosphonitrilic esters which comprises immersing at room temperature high-molecular polyphosphonitrilic chlorides of rubber-like consistency in an organic solvent immiscible with water and allowing the mixture to stand at least until no more swelling occurs; then adding thereto a liquid mixture containing pyridine and ethyl alcohol, both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

14. The process of preparing elastomeric polyphosphonitrilic esters which comprises immersing at room temperature high-molecular polyphosphonitrilic chlorides of rubber-like consistency in an organic solvent selected from the group consisting of aromatic hydrocarbons and halogen derivatives of aliphatic and aromatic hydrocarbons and allowing the mixture to stand at least until no more swelling occurs; then adding thereto a liquid mixture containing pyridine and ethyl alcohol, both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

15. The process of preparing elastomeric polyphosphonitrilic esters which comprises immersing at room temperature high-molecular polyphosphonitrilic chlorides of rubber-like consistency in toluene and allowing the mixture to stand at least until no more swelling occurs; then adding thereto a liquid mixture containing pyridine and ethyl alcohol both the alcohol and pyridine being used in amounts at least equal to the stoichiometric equivalents required for respectively replacing the chlorine contents of the polyphosphonitrilic chloride and binding the hydrogen chloride thereby produced, and leaving the reaction mixture to stand for at least the time required for producing a polyphosphonitrilic ester in the form of a gel.

BINYAMIN REFAEL DISHON.
FRIEDA GOLDSCHMIDT.

REFERENCES CITED

The following references are of record in the file of this patent:

UNITED STATES PATENTS

| Number | Name | Date |
|---|---|---|
| 2,109,491 | Lipkin | Mar. 1, 1938 |
| 2,192,921 | Lipkin | Mar. 12, 1940 |
| 2,214,769 | Lipkin | Sept. 17, 1940 |

OTHER REFERENCES

Audrieth et al.: Chemical Review, vol. 32, 1943, pp. 129 and 130.